(12) United States Patent
Kankipati et al.

(10) Patent No.: US 12,452,121 B2
(45) Date of Patent: Oct. 21, 2025

(54) DYNAMIC SWITCHING IN RADIO RECEIVERS

(71) Applicant: Nordic Semiconductor ASA, Trondheim (NO)

(72) Inventors: Sriram Kankipati, Hyderabad (IN); Paul Vincent, Hyderabad (IN)

(73) Assignee: Nordic Semiconductor ASA, Trondheim (NO)

( * ) Notice: Subject to any disclaimer, the term of this patent is extended or adjusted under 35 U.S.C. 154(b) by 86 days.

(21) Appl. No.: 18/515,046

(22) Filed: Nov. 20, 2023

(65) Prior Publication Data

US 2024/0171446 A1    May 23, 2024

(30) Foreign Application Priority Data

Nov. 23, 2022  (IN) .............................. 202211067255

(51) Int. Cl.
*H04L 27/26* (2006.01)

(52) U.S. Cl.
CPC ...... *H04L 27/2697* (2013.01); *H04L 27/2649* (2013.01)

(58) Field of Classification Search
CPC .................. H04L 27/2697; H04L 27/2649
See application file for complete search history.

(56) References Cited

U.S. PATENT DOCUMENTS

| | | | |
|---|---|---|---|
| 5,732,337 A | 3/1998 | Wargnier et al. | |
| 2005/0265401 A1 | 12/2005 | Boldt et al. | |
| 2006/0067293 A1* | 3/2006 | Santhoff | H04B 1/7176 370/347 |
| 2009/0190633 A1* | 7/2009 | Smith | H04B 1/123 375/346 |
| 2013/0329720 A1* | 12/2013 | Yu | H04L 27/2662 370/350 |
| 2017/0288723 A1* | 10/2017 | Shah | H04L 27/0012 |

FOREIGN PATENT DOCUMENTS

| | | |
|---|---|---|
| WO | WO 2004/057771 A1 | 7/2004 |
| WO | WO 2006/081559 A2 | 8/2006 |

OTHER PUBLICATIONS

ISO Search Report under Section 17 for Great Britain Application No. 2300720.6, dated Jul. 27, 2023, 4 pages.

* cited by examiner

*Primary Examiner* — Janice N Tieu
(74) *Attorney, Agent, or Firm* — Klarquist Sparkman, LLP

(57) ABSTRACT

A digital radio receiver comprises a configurable filter, a configurable re-sampler and a configurable mixer, and operates in accordance with a predetermined radio communication protocol which defines a first type of data packet that, when transmitted, occupies a first range of frequencies, and a second type of data packet that, when transmitted, occupies a second range of frequencies, the first range being wider than the second range. The filter, re-sampler and mixer process data packets of both the first and second type. By default, the filter attenuates frequencies that fall outside of the first range. When the receiver receives a data packet transmitted by a remote device it determines whether the data packet is of the second type and, if so, it configures the filter to attenuate frequencies that fall outside of the second range, and configures the re-sampler and mixer in dependence on the determination.

20 Claims, 6 Drawing Sheets

DYNAMIC SWITCHING IN RADIO RECEIVERS

CROSS REFERENCE TO RELATED APPLICATION

This application claims priority from Indian Patent Application No. 202211067255, filed Nov. 23, 2022, which application is incorporated herein by reference in its entirety.

FIELD

The present invention relates to wireless digital radio communications, particularly though not exclusively in relation to the Wi-Fi™ protocol.

BACKGROUND

The Wi-Fi™ protocol or standard has been continuously developed since its original release, and numerous versions of the protocol have been released during that time. Some particularly prominent releases include the releases of IEEE 802.11b (published 1999), 802.11a (published 1999), 802.11g (published 2003), 802.11n (published 2009) and 802.11ax (published 2019).

Each version of the protocol defines a type of data packet and various parameters thereof, including e.g. bandwidth, modulation and coding scheme (MCS), timing, data format, etc. However, each version of the Wi-Fi™ protocol maintains backwards compatibility with previous versions in order to ensure that new devices remain compatible with older devices. Maintaining backward compatibility is not limited to the Wi-Fi™ protocol, however—it is commonplace among most developing wireless communication protocols.

Therefore, modern devices operating in accordance with the Wi-Fi™ protocol (or indeed another protocol which maintains backward compatibility with previous versions) need to be able to transmit/receive data packets in accordance with every previously released version of the protocol.

The present invention seeks to provide operational improvements in radio receivers operating in accordance with such backwards-compatible protocols—e.g. the Wi-Fi™ protocol—or indeed any wireless digital radio communication protocol defining more than one type of data packet.

SUMMARY OF THE INVENTION

When viewed from a first aspect, the invention provides a digital radio receiver comprising a configurable filter, a configurable re-sampler and a configurable mixer, the receiver being configured to operate in accordance with a predetermined radio communication protocol, wherein:
  the predetermined radio communication protocol defines a first type of data packet that, when transmitted, occupies a first range of frequencies, and a second type of data packet that, when transmitted, occupies a second range of frequencies, the first range of frequencies being wider than the second range of frequencies;
  the filter, the re-sampler and the mixer are arranged to process data packets of both the first and second type;
  the filter is configured, by default, to attenuate frequencies that fall outside of the first range; and
  the receiver is configured to:
    receive a data packet transmitted by a remote device;
    determine whether the data packet is of the second type;
    in response to a determination that the data packet is of the second type, configure the filter to attenuate frequencies that fall outside of the second range, and configure the re-sampler and the mixer in dependence on the determination.

When viewed from a second aspect, the invention provides a method of operating a digital radio receiver comprising a configurable filter, a configurable re-sampler and a configurable mixer, the receiver operating in accordance with a predetermined communication protocol, wherein:
  the predetermined radio communication protocol defines a first type of data packet that, when transmitted, occupies a first range of frequencies, and a second type of data packet that, when transmitted, occupies a second range of frequencies, the first range of frequencies being wider than the second range of frequencies; and
  the method comprises:
  the filter, the re-sampler and the mixer processing data packets of both the first and second type;
  configuring the filter, by default, to attenuate frequencies that fall outside of the first range;
  receiving a data packet transmitted by a remote device;
  determining whether the data packet is of the second type;
  in response to a determination that the data packet is of the second type, configuring the filter to attenuate frequencies that fall outside of the second range, and configuring the re-sampler and the mixer in dependence on the determination.

It will be seen, in accordance with the present invention, that a filter, re-sampler and mixer are each shared by a receiver for receipt of data packets of both the first type and the second type, rather than e.g. providing a dedicated filter, re-sampler and mixer for processing of the two types of data packet. This may advantageously reduce the area of silicon required for the receiver, as well as reduce overall power consumption and the bill-of-materials required to manufacture the receiver.

It will also be seen, in accordance with the present invention, that the receiver is able to dynamically configure its filter for optimal filtering of a data packet in dependence on the type of packet that is received. In particular, while most communication protocols define nominal bandwidths for packet transmission, the actual bandwidth occupied by a packet when it is transmitted may be smaller than its nominal bandwidth. The Applicant has recognised that the optimum filter configuration for different types of packets may differ depending on the type of packet, even when the protocol defines the same nominal bandwidth for the different packet types. While a receiver could potentially function by using a configuration suitable for the type of packet that occupies the wider frequency range, as this would not cut off any occupied frequencies for either type of packet, the Applicant has recognised that receipt of the type of packet that occupies the smaller range of frequencies (i.e. the second type of data packet) can be improved by configuring the filter to attenuate more out-of-band frequencies.

Thus it will be seen that the present invention may advantageously increase the signal-to-noise ratio (SNR) of a received data packet, before decoding is attempted thereon, when the received packet is of the second type (i.e. it occupies a smaller bandwidth), as a greater proportion of out-of-band frequencies (which typically contain noise only) are filtered out by the filter for the second type of data packet.

Furthermore, by providing the filter with the default configuration of attenuating frequencies that fall outside of the first, wider frequency range, the receiver may retain the ability to receive both the first and the second type of data packet, as the filter may avoid attenuating any in-band frequencies of either packet type (thereby leading to potential data loss).

The term "range of frequencies" may be used interchangeably herein with the terms "frequency range", "bandwidth" and/or "frequency bandwidth". It will be appreciated that references to frequencies falling outside of a given frequency range, as used herein, refer to frequencies that are greater than the upper limit of that range, or lower than the lower limit of that range. The first and second ranges of frequencies occupied by the first and second types of data packet respectively, when transmitted, may be determined by considering a −6 dB cutoff—i.e. they may comprise the ranges of frequencies with amplitudes greater than −6 dB relative to the peak amplitude.

In a set of embodiments, the receiver maintains the default configuration of the filter whenever it does not determine that the data packet is of the second type. This may be beneficial in arrangements in which there are multiple packet types which have a wider bandwidth than the second type as it may not be necessary to distinguish between these multiple types. In other embodiments the receiver also determines specifically whether the data packet is of the first type, and maintain the default configuration of the filter in response to this determination. It may determine whether the data packet is of the first type at substantially the same time as determining whether the data packet is of the second type—e.g. if only two packet types are supported.

The first and second types of data packet typically each comprise a preamble and a payload. The respective preambles may comprise one or more training signals for enabling a receiver to perform channel estimation, frequency offset estimation, time synchronisation, etc. The respective preambles may comprise data indicative of a modulation and coding scheme used for transmission of the payload. The respective payloads may comprise data intended for receipt by the receiver.

The predetermined radio communication protocol may be the Wi-Fi™ (IEEE 802.11) protocol. The first type of data packet may comprise data packets transmitted using orthogonal frequency division multiplexing (OFDM), and may comprise 802.11a/g/n/ax data packets. The second type of data packet may comprise data packets which are transmitted using a direct-sequence spread spectrum (DSSS) modulation scheme or a complementary code keying (CCK) modulation scheme, and may comprise 802.11b data packets. The first frequency range occupied by the first type of data packet, when transmitted, may be 18 MHz wide when considering a −6 dB cutoff. The second frequency range occupied by the second type of data packet, when transmitted, may be 13 MHz wide when considering a −6 dB cutoff.

The predetermined communication protocol may define a nominal bandwidth for each of the first and second types of data packet. The first and second ranges of frequencies occupied by the first and types of data packet respectively, when transmitted, may be smaller than the respective nominal bandwidths defined for the first and second types of data packet respectively. The nominal bandwidth of the first type of data packet may for example be equal to 20 MHz, and the nominal bandwidth of the second type of data packet may for example be equal to 22 MHz.

In a set of embodiments, the receiver initially detects receipt of the data packet before determining whether it is of the second type. The receiver may detect receipt of the data packet while receiving the preamble thereof. Where the receiver also determines whether the data packet is of the first type it may also detect receipt of the data packet before performing this determination.

In a set of embodiments, the receiver determines whether the data packet is of the second type by cross-correlating at least a portion of the preamble of the data packet to one or more locally stored predetermined preamble formats associated with the second type of data packet. The receiver may determine that the data packet is of the second type when a result of this cross-correlation exceeds a predetermined threshold. Where the receiver also determines whether the data packet is of the first type it may auto-correlate at least a portion of the preamble, and determine that the data packet is of the first type when a result of this auto-correlation exceeds a predetermined threshold. The auto-correlation may be performed with a delay of 0.8 µs in order to identify a periodicity of a legacy synchronisation training field (L-STF) of the preamble. The receiver may simultaneously perform the cross-correlation with one or more preamble formats associated with the second type of data packet and perform the auto-correlation. The receiver may determine that the packet is of the first type when the results of the both the cross-correlation and the auto-correlation exceed the respective predetermined thresholds.

The stored predetermined preamble formats associated with the second type of data packet may be stored at a first nominal sampling frequency associated with a payload of the first type of data packet. Thus, the cross-correlation mentioned above for determining whether the data packet is of the second type may be performed at the first nominal sampling frequency. Similarly, the auto-correlation mentioned above for determining whether the data packet is of the first type may also be performed at the first nominal sampling frequency. This may advantageously enable the receiver to detect and receive the preambles of both types of data packet using the same default sampling frequency. The first nominal sampling frequency may be an optimal sampling frequency for decoding a payload of the first type of data packet, and may for example be equal to 20 MHz. An optimal sampling frequency for decoding a payload of the second type of data packet may be a second nominal sampling frequency that is different from the first, which may for example be equal to 22 MHz. The first and second nominal sampling frequencies may be defined by the predetermined protocol.

In a set of embodiments, the receiver determines whether the data packet is of the second type while receiving the data packet. It may perform this determination while receiving the preamble of the data packet. It may perform the determination before the start of receipt of the payload of the data packet. This may enable the receiver to detect the type of packet received before it begins receiving the payload thereof (which may comprise the data intended for transmission to/receipt by the receiver). As set out below, this may allow the filter to be configured for the narrower frequency range, where appropriate, before receipt of the payload.

In a set of embodiments, the receiver configures the filter to attenuate frequencies that fall outside of the second range (in response to a determination that the packet is of the second type) while receiving the data packet. It may configure the filter, re-sampler and mixer while receiving the preamble of the data packet. It may configure the filter before the start of receipt of the payload of the data packet. Thus it will be seen that, in such embodiments, the receiver may be able to detect the presence of the second type of packet, and configure the filter accordingly for optimal filtering of the second type of packet, in advance of receiving the payload (i.e. the data intended for receipt by the receiver) thereof, thereby improving the overall SNR for the payload of the second type of data packet.

In a set of embodiments, the receiver returns the filter, re-sampler and mixer to their default configuration after receipt of the data packet is completed and before receipt of a second data packet commences. Thus it will be seen that, in such embodiments, the receiver automatically restores the default configuration of the filter, re-sampler and mixer after receipt of every data packet. This may advantageously ensure that the receiver is prepared to receive a subsequent data packet of either type, e.g. by ensuring that no in-band frequencies of the next data packet to be received will be attenuated.

Preferably, the filter is a decimation filter. It may be configured to receive a digital input signal comprising a plurality of samples representative of an analogue input signal, and output a digital output signal comprising a plurality of samples representative of a filtered version of the analogue input signal, where frequency components that fall outside of the first/second range (depending on configuration) are attenuated. The filter may effectively function as a low-pass filter.

In a set of embodiments, the decimation filter reduces the number of samples per unit time of the digital input signal in order to generate the digital output signal. This may also be referred to herein as downsampling. The decimation filter may reduce the number of samples per unit time of the input digital signal by a factor of two in order to generate the output digital signal. In other words, the decimation filter may have a decimation factor of two. Such embodiments may advantageously reduce processing requirements for signals output by the decimation filter e.g. for the above-mentioned cross-correlation and auto-correlation operations, and for decoding.

The decimation filter may be configured to attenuate frequencies falling outside of the first/second range (depending on configuration) before downsampling the digital input signal.

In a set of embodiments, the decimation filter comprises one or more configuration inputs for controlling one or more operational parameters of the decimation filter, and the receiver configures the decimation filter to attenuate specific frequencies by controlling one or more of the operational parameters using one or more of the configuration inputs. The receiver may be configured to adjust the one or more operational parameters of the decimation filter while receiving the preamble of the data packet.

In a set of embodiments, the receiver further comprises an analogue-to-digital converter (ADC). The ADC may be configured to receive an analogue input signal and output a digital signal comprising a plurality of samples representative of said analogue input signal. The analogue input signal represented by the digital signal output by the ADC may comprise a complex baseband signal comprising I and Q components. A nominal ADC output sampling frequency may be greater than or equal to a reserved frequency range for transmission of the data packet determined during an association procedure with the remote device. The actual sampling frequency of the signal output by the ADC may differ from the nominal ADC output sampling frequency (e.g. due to manufacturing tolerances, power supply noise, etc.). Where the decimation filter downsamples the digital input signal by a factor of two, the nominal ADC output sampling frequency may be equal to double the first nominal sampling frequency. The ADC being configured in this manner may provide a convenient mechanism for ensuring that the sampling frequencies used throughout the chain default to frequencies associated with the first type of data packet.

The receiver may further comprise one or more antennas for receiving radio-frequency signals. It may also comprise an analogue processing chain, the input of the analogue processing chain being coupled to the antenna and the output of the analogue processing chain being coupled to an input of the ADC. The analogue processing chain may comprise one or more modules configured to perform one or more of amplifying, mixing, filtering, etc. on a radio-frequency signal received at the antenna.

Thus it will be seen that, in such embodiments, the receiver may advantageously use the same analogue processing chain and ADC for receipt of both the first and the second type of data packet, thereby reducing a bill-of-materials and silicon area compared to e.g. providing a dedicated receive chain for each type of data packet.

In a set of embodiments, the receiver further comprises first decoding circuitry for decoding data packets of the first type, and second decoding circuitry for decoding the data packets of the second type. The second decoding circuitry may be distinct from the first decoding circuitry. The first and second decoding circuitries may each receive a signal from the filter. The receiver may use the second decoding circuitry to decode the data packet in response to a determination that the data packet is of the second type. It may use the first decoding circuitry to decode the data packet in response to a determination that the data packet is not of the second type, or in response to a determination that the data packet is of the first type where this determination is performed. By providing separate decoding circuitry for each type of data packet in this manner, the rate of processing of each data packet may be advantageously improved by enabling each respective decoding circuitry to be specifically tailored to its intended purpose, rather than requiring more general-purpose decoding circuitry which is typically less computationally and power efficient. This may advantageously reduce overall power consumption which may be particularly advantageous in battery-powered devices.

In a set of embodiments, the re-sampler receives a digital input signal comprising a plurality of samples representative of an analogue signal at an input sampling frequency, and outputs a digital output signal comprising a plurality of samples representative of the analogue signal at an output sampling frequency, the output sampling frequency being dependent on the configuration of the re-sampler. The input sampling frequency may be equal to the nominal ADC output sampling frequency.

In a set of embodiments, the receiver estimates a sampling frequency offset between its ADC and a digital-to-analogue converter (DAC) of the remote device, and the re-sampler alters the output sampling frequency in order to compensate for the estimated sampling frequency offset. In other words, the re-sampler may alter the sampling frequency of the signal output by the ADC to match the sampling frequency of the remote device's DAC more closely. The receiver may estimate the sampling frequency offset during the preamble of the data packet. It may estimate the offset using one or more training signals included in the preamble. An output of the re-sampler may be connected to an input of the filter.

In a set of embodiments, by default, the re-sampler outputs the digital output signal at a third sampling frequency that is proportional to the first nominal sampling frequency associated with the first type of data packet—e.g. 40 MHz—taking into account the above-mentioned sampling frequency offset compensation where this is performed. This may in some embodiments be the same as the nominal ADC output sampling frequency. Where the decimation filter downsamples the digital input signal by a factor of two, the third nominal sampling frequency may be equal to double the first nominal sampling frequency associated with the first type of data packet.

In a set of such embodiments, in response to a determination that the data packet is of the second type, the receiver configures the re-sampler to output the digital output signal at a fourth sampling frequency that is different from the third sampling frequency, taking into account the above-mentioned frequency offset compensation where this is performed. The fourth nominal sampling frequency may be proportional to the second nominal sampling frequency associated with the payload of the second type of data packet, and may for example be equal to 44 MHz. Where the decimation filter downsamples the digital input signal by a factor of two, the fourth nominal sampling frequency may be equal to double the second nominal sampling frequency. This may ensure that the signal output by the decimation filter is at the second nominal sampling frequency associated with the payload of the second type of data packet where the data packet is determined to be of the second type.

Thus it will be seen that the receiver alters the configuration of the re-sampler in dependence on the type of packet received which may allow for optimal processing of that type of packet.

The receiver may configure the re-sampler at substantially the same time as it configures the filter, which may be during the preamble of the data packet as set out above.

In a set of embodiments the receiver, during an association procedure with the remote device, determines a reserved frequency range for transmission of the data packet and, when the reserved frequency range exceeds a predetermined width, determines a primary portion of the reserved frequency range. The primary portion may have a width that is equal to the predetermined width. When the data packet is of the second type, the payload of the data packet may only occupy frequencies included in the primary portion of the reserved frequency range. The remaining portions of the reserved frequency range—i.e. other than the primary portion—may not be used for transmission of the payload, when the data packet is of the second type.

When the data packet is of the first type, the preamble of the data packet may indicate a nominal payload bandwidth, which may be wider than or equal to the predetermined width. When the nominal payload bandwidth has the predetermined width, the payload of the data packet may only occupy frequencies included in the primary portion of the reserved frequency range. When the nominal payload bandwidth is wider than the predetermined width—e.g. equal to the width of the reserved frequency range—the payload of the data packet may occupy any range of frequencies included in the reserved frequency range that includes the primary portion. When the nominal payload bandwidth has the same width as the reserved frequency range, the payload may occupy frequencies across the whole reserved frequency range.

In a set of embodiments, the mixer is a digital mixer that shifts the frequencies of an analogue input signal represented by a plurality of samples in a digital input signal by a configurable frequency shift. In other words, the mixer may receive a digital input signal comprising a plurality of samples representative of an analogue input signal with a first centre frequency, and output a digital output signal comprising a plurality of samples representative of an analogue output signal with a second centre frequency, the second centre frequency being different from the first by the configurable frequency shift. An input of the mixer may be coupled to an output of the ADC. An output of the mixer may be coupled to an input of the re-sampler. The mixer may be a complex digital mixer.

In a set of embodiments the mixer, by default, does not perform any frequency shift. In a set of embodiments the mixer, when the reserved frequency range exceeds the predetermined width and in response to a determination that the data packet is of the second type, performs a frequency shift that aligns a centre frequency of the primary portion with a centre frequency of the reserved frequency range.

The mixer may shift the centre frequency of the primary portion only for receipt of the payload of the data packet. The preamble may be transmitted over the same frequency band as the payload, though in some embodiments the mixer does not perform any frequency shift—i.e. a frequency shift of 0 Hz—during receipt of the preamble of the data packet. In such embodiments, the receiver may further comprise a preamble mixer configured to perform a frequency shift that aligns a centre frequency of a portion of the reserved frequency range occupied by the preamble with a centre frequency of the reserved frequency range. An input of the preamble mixer may be connected to an output of the decimation filter, and the above-mentioned cross-correlation and auto-correlation processes may be performed on a signal output by the preamble mixer. The preamble mixer may comprise simple, hardware-implemented digital mixer circuitry, the use of which may be enabled at least in part by the relationship between the sampling frequency at the preamble mixer input (i.e. the sampling frequency of the signal output by the decimation filter) and the amount of frequency shift required to perform the above-mentioned preamble centre frequency alignment operation.

In a set of embodiments, the ADC and/or mixer and/or re-sampler and/or filter and/or first decoding circuitry and/or second decoding circuitry each comprise dedicated hardware blocks with one or more configuration inputs for controlling one or more operational parameters thereof. The ADC, mixer, re-sampler and filter may be connected in series, e.g. in that order. The first decoding and second decoding circuitry may be connected in parallel to the output of the filter.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION OF THE DRAWINGS

Figure 1:
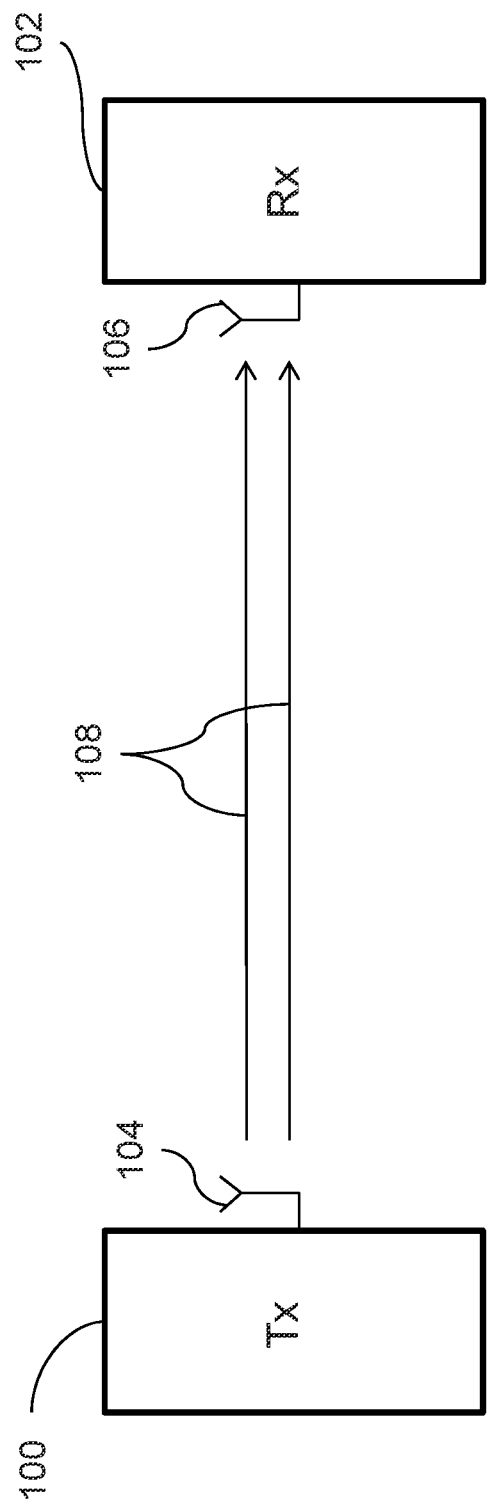
FIG. 1 is a schematic diagram illustrating a radio communication system comprising a radio receiver in accordance with an embodiment of the invention.

FIG. 1 shows a radio communication system comprising a radio transmitter 100 and a radio receiver 102. The transmitter 100 comprises an antenna 104; and the receiver 102 comprises an antenna 106. As will be well understood by those skilled in the art, a number of standard modules such as processors, oscillators, filters, amplifiers, digital to analogue converters (DACs) and analogue to digital converters (ADCs) are provided in the transmitter 100 and the receiver 102 but these are not shown in FIG. 1 for the sake of brevity. As will also be understood by one skilled in the art, the transmitter 100 and the receiver 102 may comprise any number of antennas, e.g. to support operating using MIMO (multiple input, multiple output) transmission modes.

FIG. 1 also shows the signal path 108 from the transmitter 100 through its antenna 104 to the receiver 102 through its antenna 106. The transmitter 100 and the receiver 102 are configured to operate using DSSS (direct-sequence spread spectrum) modulation, CCK (complementary code keying) modulation or OFDM (Orthogonal Frequency Division Multiplexing), depending on configuration.

While FIG. 1 shows a transmitter 100 and a receiver 102, and only shows signal paths 108 from the transmitter 100 to the receiver 102, it will be appreciated that the principles outlined herein are equally applicable to radio transceivers capable of both transmission and reception. These two devices are only described as a transmitter 100 and a receiver 102 herein for the sake of simplicity.

In this particular embodiment, the transmitter 100 and the receiver 102 operate in accordance with the Wi-Fi™ radio communication protocol, though it will be appreciated that the principles outlined herein will be equally applicable to other types of radio or wireless communications. The transmitter 100 may also be referred to as an access point (AP) 100 herein. The Wi-Fi™ protocol defines two types or groups of data packet: 802.11b packets, and 802.11a/g/n/ax packets. 802.11b packets are transmitted using DSSS modulation or CCK modulation, and 802.11a/g/n/ax packets are transmitted using orthogonal frequency division multiplexing (OFDM). Hereinafter, 802.11b packets are referred to as '11b' packets, and 802.11a/g/n/ax packets are referred to as 'OFDM' packets. Both 11b packets and OFDM packets have a nominal bandwidth of 20 MHz in accordance with the Wi-Fi™ protocol, though other bandwidths for OFDM are possible in accordance with the protocol as will be explained in more detail later.

In this example, the OFDM packets correspond to the first type of data packet as referenced previously, and the 11b packets correspond to the second type of data packet as referenced previously. Both OFDM packets and 11b packets comprise a preamble followed by a payload, as will be described in further detail later with reference to FIG. 6.

Figure 2:
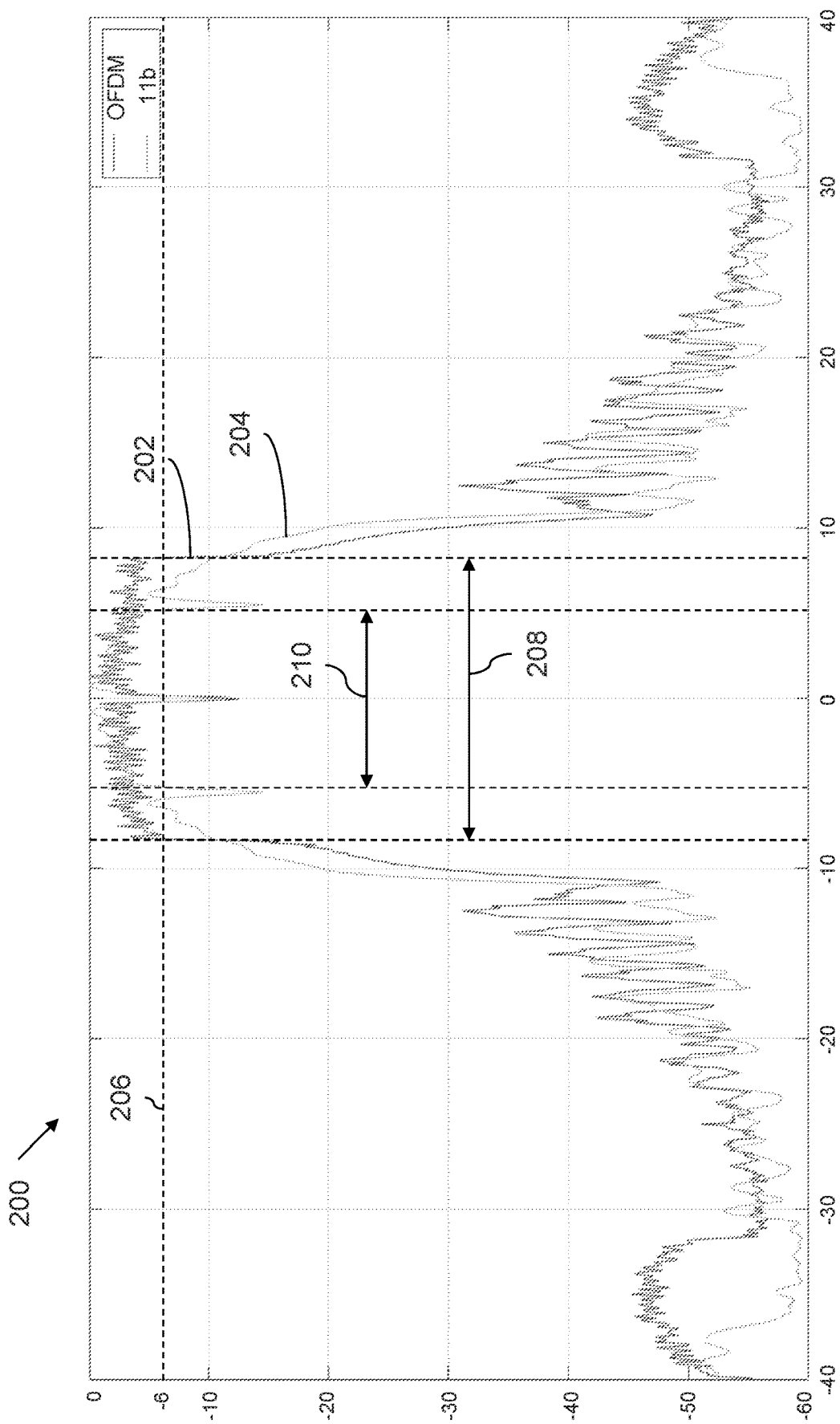
FIG. 2 is a frequency-amplitude diagram showing frequencies occupied by different types of data packet, when transmitted.

FIG. 2 shows a frequency-amplitude diagram illustrating the actual frequency spread of 11b packets and OFDM packets when transmitted by the transmitter 100. The darker line 202 shows the frequency spread of OFDM packets when they are transmitted, and the lighter line 204 shows the frequency spread of 11b packets when they are transmitted. The horizontal axis shows frequency relative to the nominal carrier frequency of the data packets when they are transmitted, in MHZ, with 0 Hz being at this nominal carrier frequency. The vertical axis shows amplitude relative to the peak amplitude for a particular data packet type, in dB.

The frequency occupancy for a given type of data packet in this example is taken to be the range of frequencies which have an amplitude greater than −6 dB (not including the central DC frequency dips)—i.e. considering a −6 dB cutoff which is illustrated by the dotted line 206. Thus it will be seen from FIG. 2 that OFDM packets occupy a first range of frequencies 208 approximately 18 MHz wide, and that 11b packets occupy a second, smaller range of frequencies 210 approximately 13 MHz wide. It will be appreciated that the frequency ranges actually occupied by both types of packet, considering a −6 dB cutoff in this manner, are smaller than the nominal 20 MHz bandwidth defined by the protocol.

Figure 3:
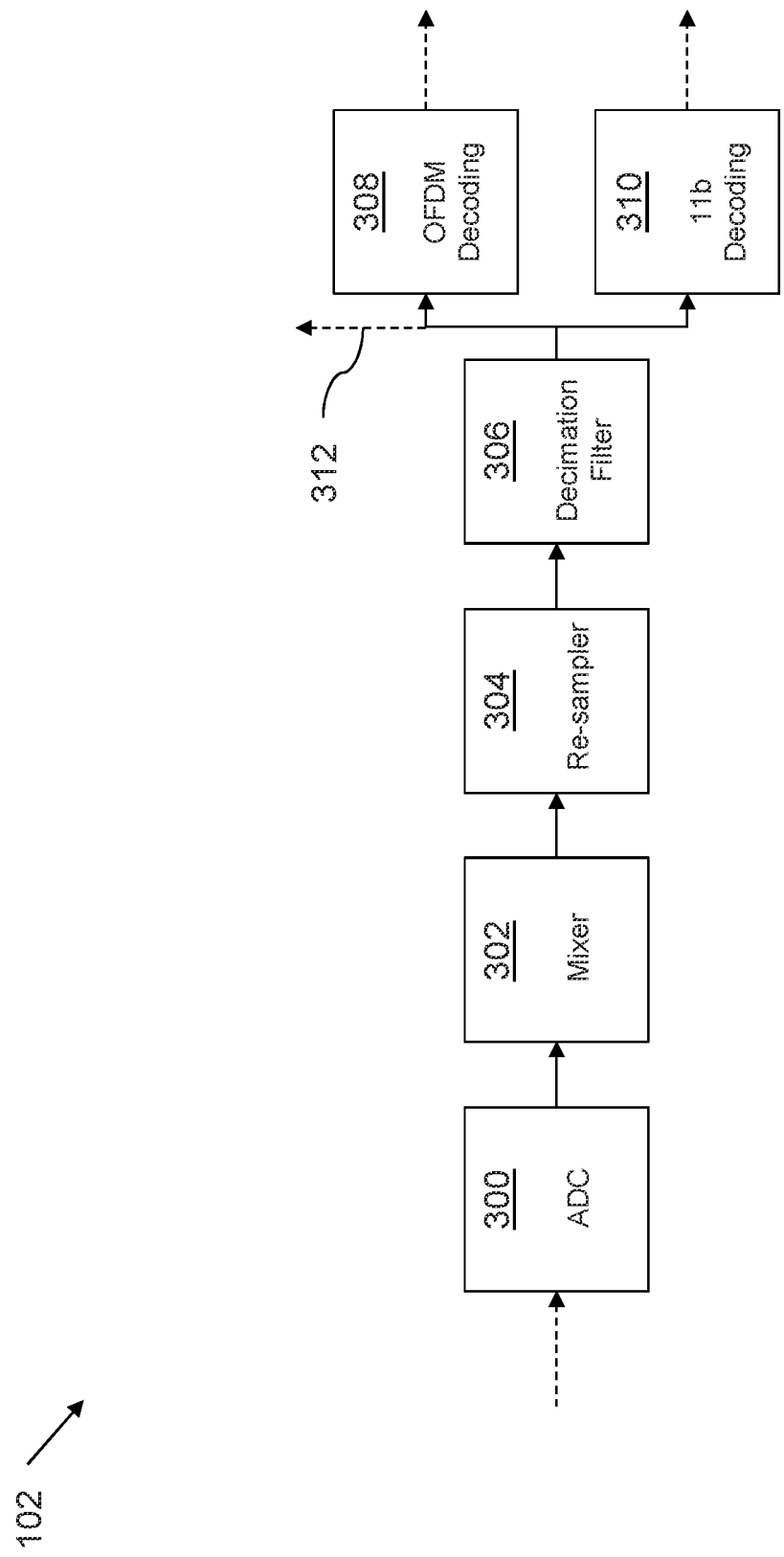
FIG. 3 is a schematic block diagram illustrating a portion of a receive chain included in the radio receiver.

FIG. 3 shows a portion of a receive chain of the receiver 102. This comprises an analogue-to-digital converter (ADC) 300, a mixer 302, a re-sampler 304 and a decimation filter 306 connected in series, and an OFDM decoding block 308 and an 11b decoding block 310 connected in parallel to the output of the decimation filter 310. The input of the ADC 300 is coupled to an output of an analogue processing chain comprising a number of modules (e.g. amplifiers, filters, etc.), but this is omitted for the sake of simplicity. An input of the analogue processing chain (not shown) is coupled to the antenna 106 shown in FIG. 1. An input of the mixer 302 is coupled to an output of the ADC 300. In this example, each of the ADC 300, mixer 302, re-sampler 304, decimation filter 306 and decoding blocks 308, 310 are dedicated hardware modules, though it will be appreciated that the principles outlined herein are equally applicable to software modules.

As will be appreciated by those skilled in the art, the receiver 102 also comprises a number of other components not shown in FIG. 3 that are omitted for the sake of simplicity, including the analogue processing chain mentioned previously.

The ADC 300 receives an analogue input signal and outputs a digital signal comprising a plurality of samples representative of that analogue input signal, as is known in the art. The ADC 300 in this example is configured to output a digital signal at a sampling frequency of 40 MHz, though it will be appreciated that the principles outlined herein are not limited to this. Indeed in this example the output sampling frequency of the ADC may be any value that it is greater than or equal to a reserved bandwidth for data packet transmission that is determined during an association procedure with the transmitter 100, as will be described in more detail later with reference to FIG. 5. The signal output by the ADC 300 is a complex baseband signal comprising I and Q components. The mixer 302 receives the signal output by the ADC 300 and may, depending on configuration, effectively shift the frequencies of the analogue signal represented by the samples in the received digital signal by a desired frequency offset. In this example, the mixer 302 is a complex digital mixer. The mixer 302 then outputs a new digital signal comprising samples representative of the (potentially) frequency shifted analogue signal.

As is known in the art per se, the receiver 102 uses the preamble of a received data packet to estimate the sampling frequency offset between a DAC of the transmitter 100 (not shown in the Figures). The re-sampler 304 receives the signal output by the mixer 302 and compensates for this estimated sampling frequency offset by changing the sampling frequency of the signal at its input to more closely match the sampling frequency of the DAC of the transmitter.

The decimation filter 306 receives the digital output by the re-sampler 304 and effectively acts as a low-pass filter for the analogue signal represented by the samples therein, the characteristics of the filtering being determined by the configuration of the decimation filter 306. In this example, the decimation filter 306 also downsamples the received digital signal by a decimation factor of 2 (i.e. it halves the sampling frequency of the signal received from the re-sampler 304). The OFDM decoding block 308 and 11b decoding block 310 then receive the downsampled and filtered digital signal output by the decimation filter 306. The decoding blocks 308, 310 may then output the decoded signals to further components of the receiver which are not shown in FIG. 3 for the sake of simplicity e.g. a processor. The output 312 of the decimation filter 306 is also fed to a correlation block as will be described in further detail later with reference to FIG. 4.

The mixer 302, re-sampler 304 and decimation filter 306 are all configurable. The skilled person will appreciate that these modules may be configured in any suitable manner, though in this example each of these comprises one or more configuration inputs (see FIG. 4) for controlling one or more operational parameters thereof. By default, the receiver 102 configures the re-sampler 304 and the decimation filter 306 for optimal processing of OFDM data packets. In order to do this, the receiver 102 configures the re-sampler 304 to compensate for the estimated sampling frequency offset between the transmitter 100 and to output a signal at a nominal sampling frequency associated with OFDM packets, 40 MHz in this example, and the receiver 102 and configures the decimation filter 306 to attenuate or filter out frequency components that fall outside of the 18 MHz frequency band occupied by OFDM packets, as shown in FIG. 2.

The receiver 102 also configures the mixer 302, dependent on packet type, as is explained in more detail later with reference to FIG. 5.

Figure 4:
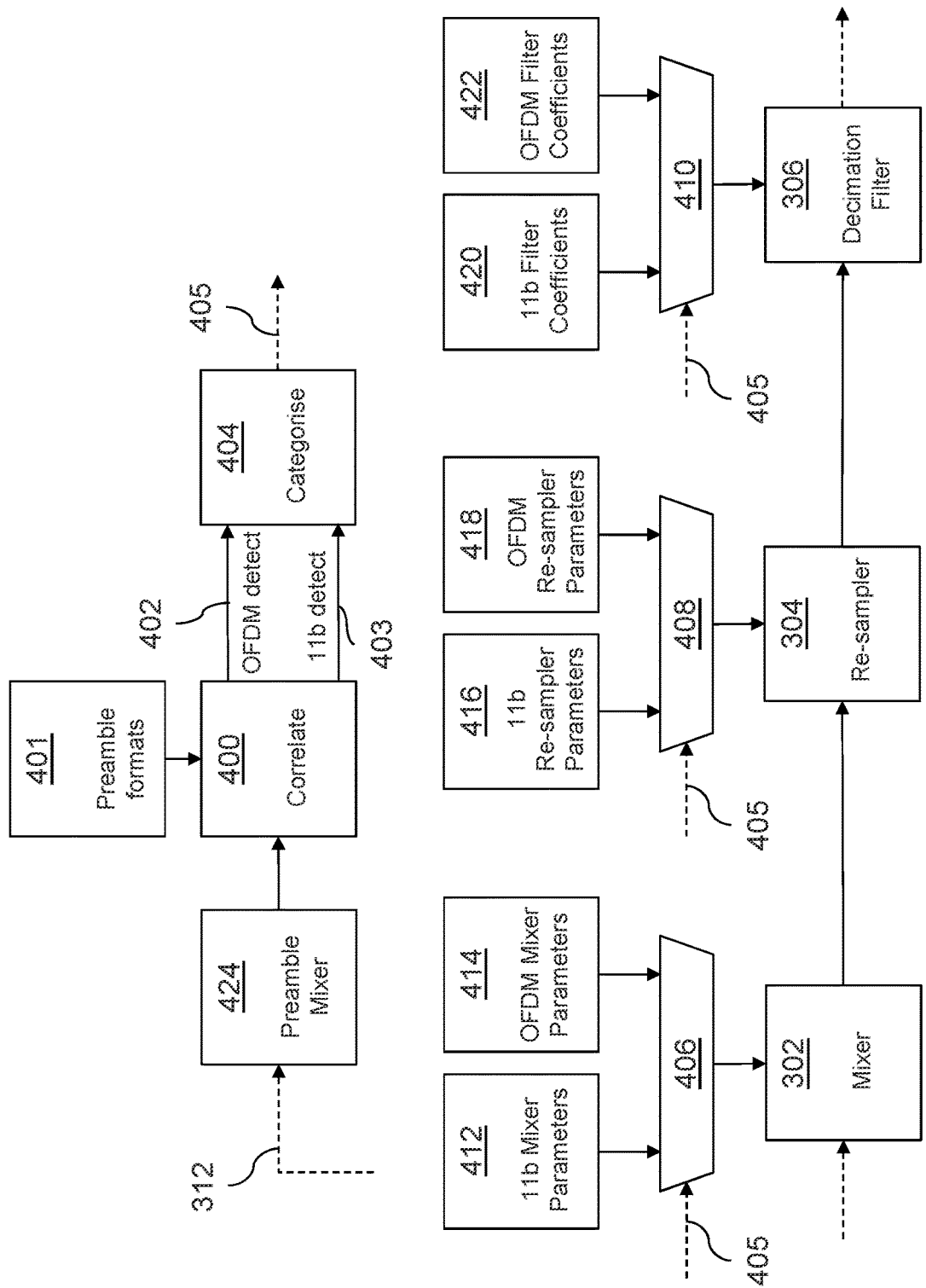
FIG. 4 is a schematic block diagram illustrating a filter of the radio receiver in more detail.

By configuring the re-sampler 304 and decimation filter 306 for optimal processing of OFDM packets by default in this manner, the receiver 102 ensures that it is able to receive the preambles of both OFDM packets and 11b packets, as the frequency range occupied by 11b packets is smaller than that for OFDM packets and the optimal sampling frequency for OFDM is also suitable (although not optimal) for 11b packets, provided the 11b detection is designed accordingly (which it is in this embodiment as described in further detail later with reference to FIG. 4).

When a packet is received by the receiver 102, the receiver detects receipt thereof and categorizes it as an OFDM packet or as an 11b packet. This process is described in more detail later with reference to FIG. 4.

When the receiver 102 determines that the received packet is an OFDM packet, it maintains the default configuration of the re-sampler 304 and decimation filter 310 for optimal processing of OFDM packets. However, when the receiver 102 determines that the received packet is an 11b packet, it reconfigures the re-sampler 304 and decimation filter 310 for optimal processing of 11b packets. The details of this reconfiguration, and the timings thereof, are described in further detail later with reference to FIG. 6.

When an inbound data packet is detected by the receiver 102 and determined to be an OFDM packet, the OFDM decoding block 308 is used to decode the output of the decimation filter 306. When an inbound data packet is detected by the receiver 102 and determined to be an 11b packet, the 11b decoding block 310 is used to decode the output of the decimation filter 306. It will be appreciated by those skilled in the art that this may be implemented in any appropriate manner e.g. using one or more multiplexers (not shown), providing enable/disable inputs for the decoding blocks 308, 310, etc.

FIG. 4 is a schematic block diagram showing the receive chain of the receiver 102 in more detail, illustrating example mechanisms for detecting and categorising a received data packet and for configuring operational parameters of the mixer 302, the re-sampler 304 and the decimation filter 306. Shown are a correlation block 400, a set of predetermined preamble formats 401, a categorisation block 404, a first multiplexer 406, a second multiplexer 408, a third multiplexer 410, a set of 11b mixer parameters 412, a set of OFDM mixer parameters 414, a set of 11b re-sampler parameters 416, a set of OFDM re-sampler parameters 418, a set of 11b filter coefficients 420, a set of OFDM filter coefficients 422 and a preamble mixer 424.

The preamble mixer 424 receives the output of the decimation filter 306 shown in FIG. 3 from the decimation filter output 312. The preamble mixer 424 is only used for the preamble of a received data packet and effectively shifts the frequencies of the analogue signal represented by the samples output by the decimation filter 306. The operation of the preamble mixer 424 is described in more detail later with reference to FIG. 5. The correlation block 400 receives the output of the preamble mixer 424, cross-correlates the received signal with stored preamble formats in the set 401, and performs auto-correlation on the received signal. In particular, the correlation block 400 simultaneously cross-correlates the received signal with preamble formats associated with 11b packets stored within the set of preamble formats 401 (in order to determine whether the received signal is a preamble of an 11b packet), and performs auto-correlation on the received signal (in order to determine whether the received signal is a preamble of an OFDM packet). The set of preamble formats 401 may be stored locally e.g. in a non-volatile memory of the receiver 102, though it will be appreciated that they may be stored in any appropriate manner as is well-known in the art. The auto-correlation in this particular example is performed with a delay of 0.8 µs in order to identify a periodicity of a legacy synchronisation training field (L-STF) of the preamble.

In this embodiment, the 11b preamble formats stored within the set 401 are sampled at the downsampled OFDM sampling rate, which in this example is equal to 20 MHz (i.e. the sampling frequency at the output of the decimation filter 306). This enables the same default sampling rate to be used for detection of the preambles of both OFDM packets and 11b packets. Thus, the cross-correlation with preamble formats associated with 11b formats stored in the set 401, and the auto-correlation, are both performed at the same default sampling rate—i.e. 20 MHz. The re-sampler can then be reconfigured in dependence on the type of packet detected for optimal reception of the payload, as is described in further detail later with reference to FIG. 6.

If the result of the OFDM auto-correlation exceeds a predetermined threshold, the correlation block outputs a positive OFDM detection signal 402 to the categorisation block 404 indicating that an OFDM preamble has been detected. If the result does not exceed the predetermined threshold then the correlation block 400 outputs a negative OFDM detection signal 402 indicating that an OFDM preamble has not been detected. Similarly, if the result of the 11b cross-correlation exceeds a predetermined threshold, the correlation block outputs a positive 11b detection signal 403 to the categorisation block indicating that an 11b preamble has been detected, or a negative 11b detection signal 403 if not.

It will be appreciated that the terms 'positive' and 'negative' used here are merely illustrative and can be implemented in any appropriate manner as is well-known in the art e.g. where a positive signal is a logical '1' and a negative signal is a logical '0', or vice versa.

The categorisation block 404 receives the OFDM detection signal 402 and the 11b detection 403, and uses these to determine whether the incoming data packet is an OFDM packet or an 11b packet. In the event that both detection signals 402, 403 are positive, the categorisation block 404 determines that the incoming data packet is an OFDM packet, as the positive OFDM detection signal 402 is received earlier than the 11b detection signal 403 due to the OFDM auto-correlation process completing quicker than the 11b cross-correlation process (e.g. as auto-correlation is typically a faster operation than multiple cross-correlations). If just one positive detection signal 402, 403 is received, the categorisation block determines that the incoming data packet is of the corresponding type. If no positive detection signals 402, 403 are received, the categorisation block determines that no incoming data packet was detected.

The categorisation block 404 then outputs a control signal 405 to the multiplexers 406, 408, 410 in dependence on whether the received packet is an OFDM packet or an 11b packet.

The output of the first multiplexer 406 is coupled to a configuration input of the mixer 302, the output of the second multiplexer 408 is coupled to a configuration input of the re-sampler 304, and the output of the third multiplexer 406 is coupled to a configuration input of the decimation filter 306. Thus, the output of the first multiplexer 406 determines the frequency shift applied by the mixer 302 to the analogue signal represented by samples in the digital signal it receives from the ADC 300 (shown in FIG. 3), the output of the second multiplexer 408 determines the output sampling frequency of the re-sampler 304, and the output of the third multiplexer 406 determines the operational parameters of the decimation filter 306—specifically which frequency components of the analogue signal represented by the samples in the digital signal received by the decimation filter 306 from the re-sampler 304 are attenuated, and which aren't. In other words, the output of the multiplexer 406 effectively configures the cut-off frequencies of the decimation filter 306.

The control signal 405 output by the comparison block 402 controls whether the multiplexers 406, 408, 410 output the respective 11b configuration parameters 412, 416, 420 or the respective OFDM configuration parameters 414, 418, 422 to the mixer 302, re-sampler 304 and decimation filter 306 respectively. By default, the categorisation block 404 outputs a control signal 405 to the multiplexers 406, 408, 410 that causes them to output the OFDM configuration parameters 414, 418, 422 to the mixer 302, re-sampler 304 and decimation filter 306 respectively. When the categorisation block 404 determines that a received data packet is an OFDM packet, it continues to output this default control signal 405. When the categorisation block 404 determines that the received data packet is an 11b packet, it changes the control signal 405 output to the multiplexers 406, 408, 410 such that they output the 11b configuration parameters 412, 416, 420 to the mixer 302, re-sampler 304, and decimation filter 306 respectively.

The 11b and OFDM configuration parameters 412, 414, 416, 418, 420, 422 may be stored e.g. in non-volatile memory (not shown) included in the receiver 102, though it will be appreciated that they may be stored in any appropriate manner as is well-known in the art. The set of preamble formats 401, and the configuration parameters 412, 414, 416, 418, 420, 422 may be stored in the same memory module.

The operation of the mixer 302, the first multiplexer 406, the 11b mixer parameters 412 and OFDM mixer parameters 414 will be described in greater detail later on with reference to FIG. 5. The 11b re-sampler parameters 416, when output to the re-sampler 304 by the second multiplexer 408, cause it to output a digital signal at a nominal sampling frequency of 44 MHz. The OFDM re-sampler parameters 418, when output to the re-sampler 304 by the second multiplexer 408, cause it to output a digital signal at a nominal sampling frequency of 40 MHz. The actual sampling frequency of the signal output by the re-sampler 304 may differ from these nominal sampling frequencies in view of the frequency offset compensation mentioned previously.

The OFDM filter coefficients 422, when output to the decimation filter 306 by the third multiplexer 410, cause it to attenuate frequency components that fall outside of the ~18 MHz occupied bandwidth 208 of OFDM packets shown in FIG. 2. The 11b filter coefficients 420, on the other hand, when output to the decimation filter 306 by the third multiplexer 410, cause it to attenuate frequency components that fall outside of the ~13 MHz occupied bandwidth 210 of 11b packets shown in FIG. 2. It will be appreciated, however, that the principles outlined herein are not limited to these specific frequency ranges, and that the filter coefficients 420, 422 and decimation filter 306 could be adjusted for any suitable frequency range depending on implementation.

Figure 5:
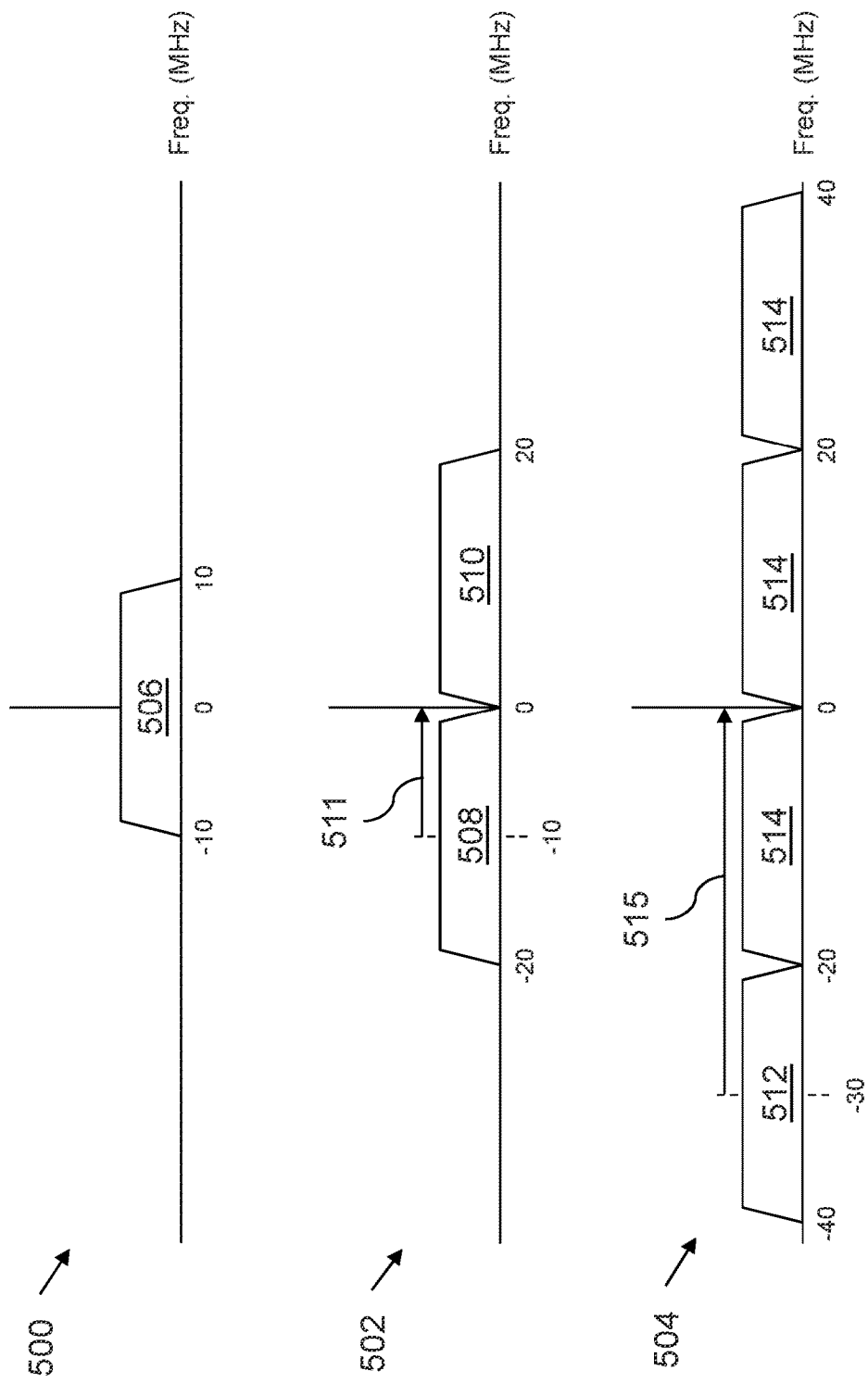
FIG. 5 shows schematic frequency-amplitude diagrams illustrating frequency occupancies of data packets with different nominal bandwidths.

FIG. 5 shows three frequency-amplitude diagrams 500, 502, 504 illustrating possible reserved bandwidths for transmission of 11b data packets in accordance with the Wi-Fi™ protocol. The nominal bandwidth of OFDM packets changes in dependence on the reserved bandwidth, whereas the nominal bandwidth of 11b payloads is fixed at 20 MHz regardless of the width of the reserved bandwidth. The size of the reserved bandwidth is determined during an association procedure with the AP 100. If the reserved bandwidth is wider than 20 MHz, then a 20 MHz portion of the overall reserved band is designated as the "primary" band during an association procedure with the AP 100. 11b packets are transmitted only over the primary band, where the reserved bandwidth is greater than 20 MHz.

OFDM packets, on the other hand, can be transmitted over numerous various possible frequency bands of width less than or equal to the reserved bandwidth. The bands used to transmit an OFDM payload are indicated in the preamble. In particular, OFDM payloads can be transmitted over any band that includes the primary band and has a width equal to $(2^n*20)$ MHz, where n is an integer greater than or equal to zero, provided this is less than or equal the total reserved bandwidth. For example, for an 80 MHz reserved bandwidth, an OFDM payload can be transmitted over the primary band only (i.e. 20 MHz bandwidth), a 40 MHz band that includes the primary band, or the entire 80 MHz reserved bandwidth.

However, the extraction of the occupied portion of the reserved bandwidth for OFDM packets in this example is performed by the OFDM decoding circuitry 308, after a Fast-Fourier-Transform (FFT) is performed. There is therefore no need to perform a frequency shift using the mixer 302 for OFDM packets. Thus, when the received packet is determined to be an OFDM data packet, the receiver 102 configures the mixer 302 not to perform any frequency shift, using the multiplexer 406 and one or more of the OFDM mixer parameters 414 shown in FIG. 4.

The first diagram 500 illustrates a 20 MHz reserved bandwidth for packet transmission. When this is the case, the 20 MHz entire frequency band 506 is nominally used to transmit the 11b packet. It can be seen that the frequency band 506 is centred around the carrier frequency (marked as 0 MHz). Thus, when the reserved bandwidth is 20 MHz, the receiver 102 configures the mixer 302 not to perform any frequency shift, as no shift is necessary in order to align the centre frequency of the frequency band 506 with the centre frequency of the total reserved bandwidth.

The second diagram 502 illustrates a 40 MHz reserved bandwidth for 11b packet transmission. In this example the first band 508 is designated as the primary 20 MHz band at the time of association with the AP 100. When this is the case, 11b packets are only transmitted over the primary 20 MHz band 508 (the other band 510 is not used for 11b packet transmission). Thus, when the incoming data packet is detected to be an 11b packet, the receiver 102 configures the mixer 302 to perform a +10 MHz frequency shift, illustrated by the arrow 511, in order to align the centre frequency of the primary band 508 with the centre frequency of the total reserved bandwidth.

The third diagram 504 illustrates an 80 MHz reserved bandwidth for 11b packet transmission. In this example the first band 512 is designated as the primary 20 MHz band at the time of association with the AP 100. When this is the case, 11b packets are only transmitted over the primary 20 MHz band 512 (the other bands 514 are not used for 11b packet transmission). Thus, when the incoming data packet is detected to be an 11b packet, the receiver 102 configures the mixer 302 to perform a +30 MHz frequency shift, illustrated by the arrow 515, in order to align the centre frequency of the primary band 512 with the centre frequency of the total reserved bandwidth.

By default, during periods of radio silence, the mixer 302 is configured not to perform any frequency shift. This is because, although the preamble and payload are transmitted over the same frequency band for both OFDM and 11b packets (e.g. the primary band for 11b packets where the reserved frequency range is greater than 20 MHZ), the preamble mixer 424 shown in FIG. 4 is used instead of the mixer 302 to perform a frequency shift that aligns the centre frequency of the bandwidth portion occupied by the preamble with the centre frequency of the total reserved bandwidth. This is performed post-decimation by the decimation filter 306, in preparation for the correlation and auto-correlation processes performed by the correlation block 400 for packet detection described previously. The preamble mixer 424 performs this frequency shift using simple, hardware-implemented digital mixer circuitry, the use of which is enabled due to the relationship between the sampling frequency at the input of the preamble mixer (i.e. the sampling frequency of the signal output by the decimation filter) and the frequency shift required for the preamble.

In these examples, the receiver 102 configures the mixer 302 before receipt of the payload, during receipt of the preamble). Once a payload has been fully received, if the mixer 302 was configured to perform a frequency shift in order to receive the payload, the receiver 102 returns the mixer 302 to the default configuration (i.e. a frequency shift of 0 Hz), in preparation for receipt of the preamble of a subsequent data packet.

Figure 6:
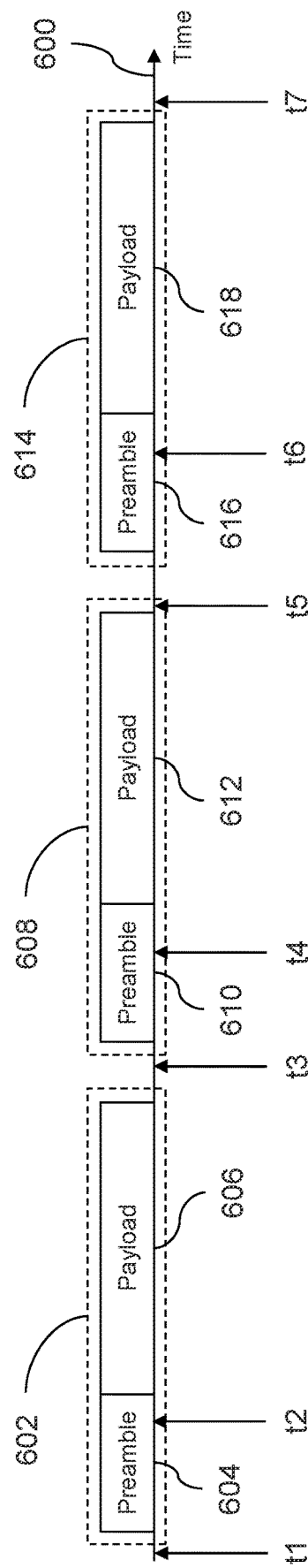
FIG. 6 is a schematic timing diagram illustrating the timings of data packet receipt and configuration of the radio receiver.

FIG. 6 shows a schematic, not-to-scale timing diagram illustrating example timings at which the receiver 102 detects and categorizes received data packets, and configures the mixer 302, the re-sampler 304 and the decimation filter 306. The axis 600 shows the flow of time.

It will be seen that the receiver receives a first data packet 602, followed by a second data packet 608, followed by a third data packet 614. The first data packet 602 is an OFDM data packet and comprises a preamble 604 followed by a payload 606. The second data packet 608 is an 11b data packet and comprises a preamble 610 followed by a payload 612. The third data packet 614 is another OFDM data packet and comprises a preamble 616 followed by a payload 618. It will be seen that there is a period of radio silence between the end of receipt of a data packet and the start of receipt of the following data packet. FIG. 6 is not to scale, so it will be recognised that the durations of the data packets 602, 608 and 614, and the periods of radio silence therebetween, could be any appropriate size.

At time t1, the re-sampler 304 and decimation filter 306 are in their default configuration for optimal processing of OFDM data packets—i.e. the re-sampler 304 is configured to output a signal with a nominal sampling frequency of 40 MHz, taking account of the above-mentioned frequency offset compensation, and the decimation filter 306 is configured to attenuate frequencies that fall outside of the ~18 MHz occupied bandwidth of OFDM data packets shown in FIG. 2. The default nominal output sampling frequency of the re-sampler 304 in this example is 40 MHz because the optimal sampling frequency for processing of OFDM packets is 20 MHz, and the decimation filter 306 in this example downsamples the signal it receives by a factor of two. The mixer 302 is also in its default configuration at time t1, whereby it performs a frequency shift of 0 Hz.

At time t2 (i.e. during the preamble 604 of the first OFDM packet 602), the receiver 102 detects the presence of the first data packet 602 and categorizes it as an OFDM packet by performing auto-correlation on the preamble 604, as explained previously. The receiver 102 therefore maintains the default configuration of the re-sampler 304 and the decimation filter 306 for optimal processing of OFDM packets, and maintains the default configuration of the mixer 302 to perform a frequency shift of 0 Hz. The receiver 102 also uses the preamble to estimate the sampling frequency offset between the transmitter 100 and the receiver 102 and configures the re-sampler 304 to compensate for this offset.

At time t3, the re-sampler 304, the decimation filter 306 and the mixer 302 are still in this default configuration. At time t4, the receiver 102 detects the presence of the second data packet 608 and categorizes it as an 11b data packet by cross-correlating the preamble 610 with the predetermined preamble formats associated with 11b packets stored in the set 401, as mentioned previously. In response, the receiver 102 configures the re-sampler 304 and the decimation filter 306 for optimal processing of 11b packets—i.e. it configures the re-sampler 304 to output a signal with a nominal sampling frequency of 44 MHZ, and configures the decimation filter 306 to attenuate frequency components falling outside of the ~13 MHz occupied bandwidth of 11b packets shown in FIG. 2. The output nominal sampling frequency of the re-sampler 304 is changed to 44 MHz in this example because the optimal sampling frequency for processing of 11b packets is 22 MHz, and the decimation filter 306 in this example downsamples the filter it receives by a factor of two. It also uses the preamble to estimate the sampling frequency offset between it and the transmitter 100 and configures the re-sampler 304 to compensate for this offset.

It may also alter the configuration of the mixer 302 in dependence on the reserved bandwidth and, possibly, which band was designated as the primary band, determined during the association procedure, as explained previously.

Altering the configuration of the decimation filter 306 in this manner, when the 11b data packet 608 is detected, may advantageously improve the signal-to-noise ratio of the 11b payload 612 when it is received by the receiver 102. More generally, altering the configuration of the mixer 302, re-sampler 304 and decimation filter 306 enables these three hardware components to be shared for receipt of both OFDM packets and 11b packets.

At time t5, after receipt of the 11b data packet 608 is completed, the receiver 102 returns to the default configuration in which the re-sampler 304 and decimation filter 306 are configured for optimal processing of OFDM data packets as described previously. It may do this immediately following receipt of the data packet 608, or at any appropriate point in the period of radio silence following receipt of the data packet 608. Also, if the configuration of the mixer 302 was changed at time t4, then it is returned to its default configuration of performing a 0 Hz frequency shift at time t5 as explained previously. Switching back to the default configuration in this manner may help ensure that the receiver 102 is able to receive a subsequent data packet regardless of whether it is an OFDM packet or an 11b packet.

At time t6, the receiver 102 detects the presence of the third data packet 614 and categorizes it as an OFDM packet. The receiver 102 therefore maintains the default configuration of the re-sampler 304, the decimation filter 306 and the mixer 302. The receiver 102 also estimates the sampling frequency offset between it and the transmitter 100 as explained previously using the preamble 616, and configures the re-sampler 304 to compensate for it.

It will be appreciated that although the time t2, t4 and t6 are shown at particular points during the preambles 604, 610 and 616 respectively, that the receiver 102 could detect the presence of and/or categories the data packets 602, 608, 614 and/or configure the re-sampler 304, the decimation filter 306 and mixer 302 at any appropriate point during receipt of the respective preambles 604, 610, 616, and that these could be performed at different times during the preambles or indeed at any point during the respective data packets 602, 608, 614. However, it may be particularly advantageous to perform these actions whilst receiving the preamble of a particular data packet, as this may enable the receiver 102 to be configured for optimal processing of a particular packet type before it receives the payload thereof.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A digital radio receiver comprising a configurable filter, a configurable re-sampler and a configurable mixer, the receiver being configured to operate in accordance with a predetermined radio communication protocol, wherein:

the predetermined radio communication protocol defines a first type of data packet that, when transmitted, occupies a first range of frequencies, and a second type of data packet that, when transmitted, occupies a second range of frequencies, the first range of frequencies being wider than the second range of frequencies;

the configurable filter, the configurable re-sampler and the configurable mixer are arranged to process the data packets of both the first and second type;

the configurable filter is configured, by default, to attenuate frequencies that fall outside of the first range; and the digital radio receiver is configured to:
receive a data packet transmitted by a remote device;
determine whether the data packet is of the second type;
in response to the determination that the data packet is of the second type, configure the configurable filter to attenuate frequencies that fall outside of the second range, and configure the configurable re-sampler and the configurable mixer in dependence on the determination.

2. The digital radio receiver as claimed in claim 1, configured to maintain the default configuration of the configurable filter whenever it does not determine that the data packet is of the second type.

3. The digital radio receiver as claimed in claim 1, wherein:
the first type of data packet comprises data packets transmitted using orthogonal frequency division multiplexing; and
the second type of data packet comprises data packets transmitted using a direct-sequence spread spectrum modulation scheme or a complementary code keying modulation scheme.

4. The digital radio receiver as claimed in claim 1, wherein:
the first frequency range occupied by the first type of data packet, when transmitted, is 18 MHz wide when considering a −6 dB cutoff; and
the second frequency range occupied by the second type of data packet, when transmitted, is 13 MHz wide when considering a −6 dB cutoff.

5. The digital radio receiver as claimed in claim 1, configured to determine whether the data packet is of the second type by:
cross-correlating at least a portion of a preamble of the data packet with one or more stored predetermined preamble formats associated with the second type of data packet; and
comparing the result of the cross-correlation to a predetermined threshold.

6. The digital radio receiver as claimed in claim 5, further configured to determine whether the data packet is of the first type by:
auto-correlating at least a portion of the preamble of the data packet; and
comparing the result of the auto-correlation to a predetermined threshold.

7. The digital radio receiver as claimed in claim 6, configured to:
simultaneously perform the cross-correlation with stored preamble formats associated with the second type of packet and the auto-correlation; and
determine that the data packet is of the first type when the results of both the cross-correlation and the auto-correlation exceed the respective predetermined thresholds.

8. The digital radio receiver as claimed in claim 5, wherein:
the one or more stored predetermined preamble formats associated with the second type of data packet are stored at a first nominal sampling frequency associated with a payload of the first type of data packet;

the cross-correlation with one or more stored predetermined preamble formats associated with the second type of data packet is performed at the first nominal sampling frequency; and the auto-correlation is performed at the first nominal sampling frequency.

9. The digital radio receiver as claimed in claim 1, configured to:

determine whether the data packet is of the second type and configure the configurable filter, the configurable re-sampler and the configurable mixer while receiving a preamble of the data packet.

10. The digital radio receiver as claimed in claim 1, configured to return the configurable filter, the configurable re-sampler and the configurable mixer to said default configuration before receipt of a second data packet commences.

11. The digital radio receiver as claimed in claim 1, wherein the configurable filter is a decimation filter configured to reduce a number of samples per unit time of a digital input signal thereto in order to generate a digital output signal.

12. The digital radio receiver as claimed in claim 1, wherein the configurable filter, the configurable re-sampler and the configurable mixer each comprise one or more configuration inputs for controlling one or more operational parameters thereof, and the digital radio receiver is arranged to configure the configurable filter, the configurable re-sampler and the configurable mixer respectively by controlling one or more of the respective operational parameters thereof using the respective one or more configuration inputs.

13. The digital radio receiver as claimed in claim 1, wherein the configurable re-sampler is configured, by default, to output a digital output signal at a nominal sampling frequency that is proportional to a first nominal sampling frequency associated with a payload of the first type of data packet.

14. The digital radio receiver as claimed in claim 13, wherein the configurable re-sampler is configured, in response to a determination that the data packet is of the second type, to output the digital output signal at a different nominal sampling frequency that is proportional to a second nominal sampling frequency associated with a payload of the second type of data packet.

15. The digital radio receiver as claimed in claim 1, further comprising an analogue-to-digital converter and being configured to estimate a sampling frequency offset between the analogue-to-digital converter and a digital-to-analogue converter of the remote device, wherein the configurable re-sampler is configured to alter its output sampling frequency in order to compensate for the estimated sampling frequency offset.

16. The digital radio receiver as claimed in claim 1 configured, during an association procedure with the remote device, to determine a reserved frequency range for transmission of the data packet and, when the reserved frequency range exceeds a predetermined width, to determine a primary portion of the reserved frequency range.

17. The digital radio receiver as claimed in claim 16, wherein:

the configurable mixer is configured, by default, not to perform any frequency shift; and when the reserved frequency range exceeds the predetermined width and in response to a determination that the data packet is of the second type, the configurable mixer is configured to perform a frequency shift that aligns a centre frequency of the primary portion with a centre frequency of the reserved frequency range.

18. The digital radio receiver as claimed in claim 1, configured to determine whether the data packet is of the first type, and comprising first decoding circuitry for decoding data packets of the first type and second decoding circuitry for decoding the data packets of the second type; wherein the digital radio receiver is configured to:

use the first decoding circuitry to decode the data packet in response to a determination that the data packet is of the first type; and use the second decoding circuitry to decode the data packet in response to a determination that the data packet is of the second type.

19. The digital radio receiver as claimed in claim 1, wherein the predetermined communication protocol is the Wi-Fi™ or IEEE 802.11 protocol, the first type of data packet comprises 802.11a/g/n/ax data packets, and the second type of data packet comprises 802.11b data packets.

20. A method of operating a digital radio receiver comprising a configurable filter, a configurable re-sampler and a configurable mixer, the digital radio receiver operating in accordance with a predetermined communication protocol, wherein:

the predetermined radio communication protocol defines a first type of data packet that, when transmitted, occupies a first range of frequencies, and a second type of data packet that, when transmitted, occupies a second range of frequencies, the first range of frequencies being wider than the second range of frequencies; and the method comprises:

the configurable filter, the configurable re-sampler and the configurable mixer processing the data packets of both the first and second type;

configuring the configurable filter, by default, to attenuate frequencies that fall outside of the first range;

receiving a data packet transmitted by a remote device;

determining whether the data packet is of the second type;

in response to the determination that the data packet is of the second type, configuring the configurable filter to attenuate frequencies that fall outside of the second range, and configuring the configurable re-sampler and the configurable mixer in dependence on the determination.

* * * * *